DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 25, 1972

900. O.G. 1230

T900,018
UREA-AMMONIUM POLYPHOSPHATE PRODUCTION

Robert G. Lee, 109 Augusta St., Florence, Ala. 35630, and Robert D. Mitchell, 102 Oak Hill Ave., Sheffield, Ala. 35660

Filed Apr. 1, 1971, Ser. No. 130,236
**Int. Cl. C05b *15/00***
U.S. Cl. 71—29
1 Sheet Drawing. 16 Pages Specification

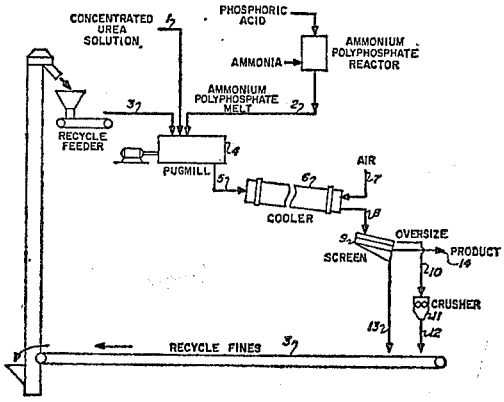

FLOWSHEET OF UREA-AMMONIUM-POLYPHOSPHATE PILOT PLANT

Pugmill (or blunger) granulation process for the production of high-analysis fertilizers composed of urea and ammonium polyphosphate. Concentrated urea solution (95–100%) and anhydrous molten ammonium polyphosphate are granulated in a pugmill in the presence of recycled solids. The moisture content of the product is sufficiently low to eliminate the need for a dryer in the process. The urea solution is sprayed onto the recycle in the pugmill upstream from the ammonium polyphosphate melt, allowing the urea to be overcoated with the melt and preventing subsequent dusting off of urea. The points of entry of the urea solution and the melt into the pugmill are separated by a minimum of 12 inches to prevent hydrolysis of the urea by the melt which results in foaming and gas evolution. Solid urea may also be used with the ammonium polyphosphate melt, which is produced from either electric-furnace or wet-process superphosphoric acid or, alternatively, from merchant-grade wet-process acid by the direct process utilizing the heat of reaction of ammonia with the acid to form polyphosphate. Other fertilizer materials such as ammonium sulfate, potassium chloride, or micronutrient sources may be incorporated by adding them to the pugmill during granulation.

UREA-AMMONIUM POLYPHOSPHATE PRODUCTION
Filed April 1, 1971
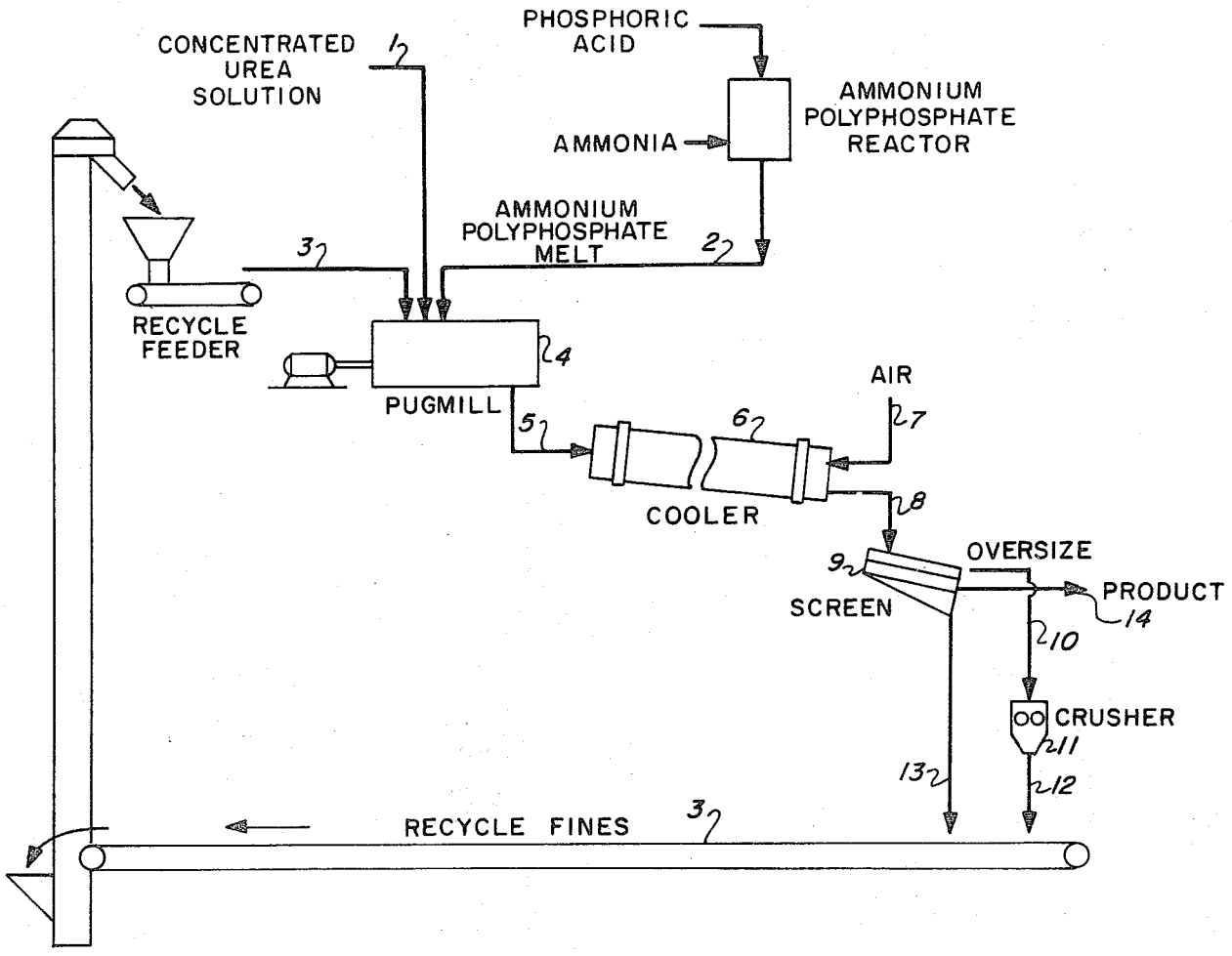
FLOWSHEET OF UREA-AMMONIUM POLYPHOSPHATE PILOT PLANT
INVENTORS.
ROBERT D. MITCHELL
ROBERT G. LEE
BY Robert A. Petrusch